July 29, 1969  K. S. DENNIS  3,458,491
ANIONIC POLYMERIZATION AND TERMINATION PROCESS
Filed March 17, 1967  3 Sheets-Sheet 1
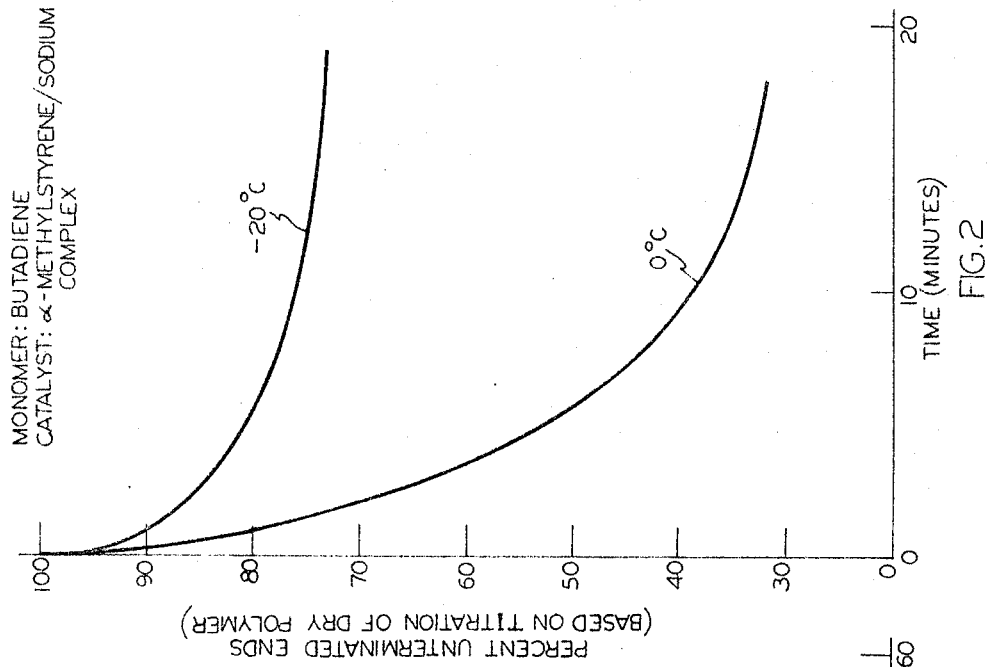
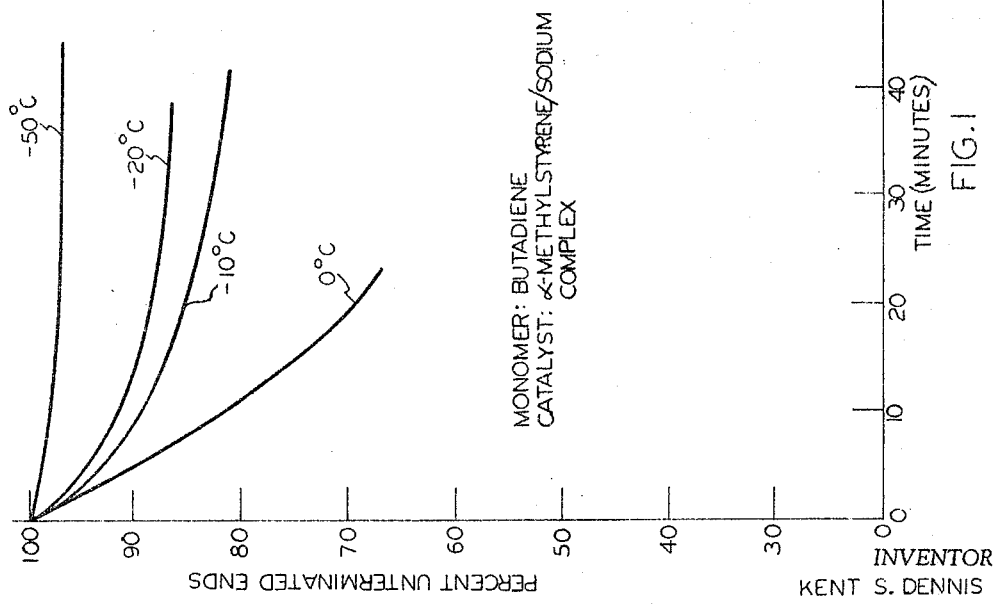
INVENTOR
KENT S. DENNIS
BY *Plumley, Tyner & Sandt*
ATTORNEYS

INVENTOR
KENT S. DENNIS

BY *Plumley, Tryner & Sandt*
ATTORNEYS

United States Patent Office 3,458,491
Patented July 29, 1969

3,458,491
ANIONIC POLYMERIZATION AND TERMINATION PROCESS
Kent S. Dennis, Midland, Mich., assignor to The Dow Chemical Company, Midland, Mich., a corporation of Delaware
Continuation-in-part of application Ser. No. 410,536, Nov. 12, 1964. This application Mar. 17, 1967, Ser. No. 624,033
Int. Cl. C08d *3/04;* C08f *3/16*
U.S. Cl. 260—94.2                                7 Claims

ABSTRACT OF THE DISCLOSURE

A process for anionic polymerization of (1) conjugated, acyclic diolefins, (2) methacrylate esters, or (3) o-chlorostyrene at −80° to 0° C. employing as the catalyst an alkali metal alkyl, an alkali metal aryl, or an alkali metal complex; adding an external terminating agent and recovering a polymer having at least 80% of its chain ends derived from the terminating agent.

DISCLOSURE

Figure 3:
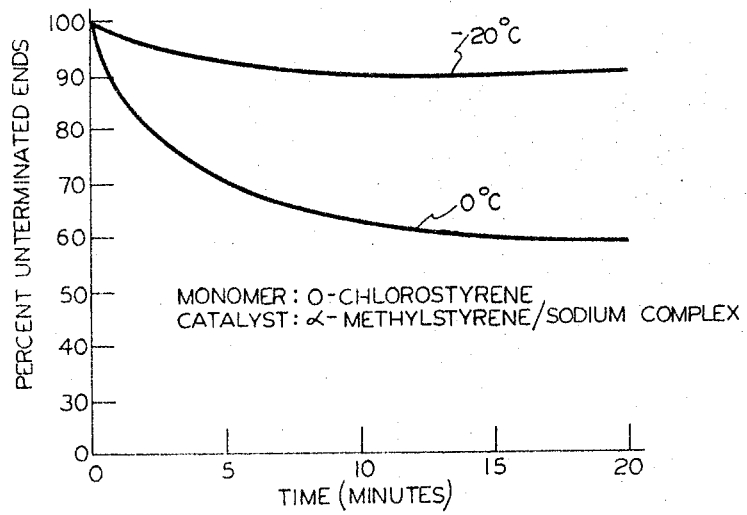

This is a continuation-in-part of copending patent application Ser. No. 410,536, filed Nov. 12, 1964, now abandoned.

This invention relates to a process for controlling anionic polymerization at temperatures in the vicinity of 0° C., and more particularly, this invention relates to a process for preparing polymers having a high percentage of predetermined end groups.

It is well-known that in the polymerization of anionically polymerizable monomers the growing polymer chain may be terminated by any of a variety of molecules or ions which may be present in the polymerization system. Frequently, such a termination is undesirable in that it stops the growing of the polymer chain and thereby produces a polymer of lower molecular weight than is desired. If the polymer can be maintained with negatively charged end groups with the capability of continuing its growth, it has been known in prior art as a "living" polymer. In this condition, the polymer can be grown to higher and higher molecular weights by the addition of more and more monomer units; or, alternatively, the polymer can be deliberately terminated by groups having certain desirable characteristics, for example, groups that can be subsequently used to produce cross-linking between adjacent polymer chains.

In the journal of Polymer Science, vol. 60, pages 99–111, F. Wenger discusses batch anionic polymerizations, and the effects impurities in the polymerization system have on the control of such polymerizations. It is shown that impurities tend to terminate the growing polymer chains and thereby to reduce the desired molecular weight of the product. In the Szwarc patent, U.S. 3,070,579, there is a discussion of "living" polymers and how they may be killed by molecules or ions which react with the end of the growing chains. The patentee describes how the "living" polymer reacts with certain materials to cause the polymer to acquire certain predetermined desirable end groups on the polymer chain. Specific examples teach the preparation of a polystyrene whose polymer chains are terminated with end groups such as carboxy, carbodithio, hydroxyl, hydroxypropyl, and the like. If the "living" polymer is killed by the addition of carbon dioxide to the polymerization system, the polymer will have carboxylic acid groups (—COOH) in the terminal positions of the polymer chain, and if the "living" polymer is killed with carbon bisulfide, the polymer will have carbodithiolic acid groups (—CSSH) in the terminal positions of the polymer chain. While processes such as that of the Szwarc patent produce polymers with predetermined end groups, with some monomers it tends to produce polymers having a broad molecular weight distribution. Furthermore, the ratio of desirable end groups to undesirable end groups is not as high in the product of the Szwarc process as one would like to have.

It is an object of this invention to provide an improved process for anionically polymerizing materials to produce a polymer in which at least 80% of the end groups of that polymer are of a predetermined chemical composition.

It is another object of this invention to provide an improved process for preparing polymers from conjugated diolefins, methacrylate esters, or o-chlorostyrene by anionic polymerization so that the polymers have reactive end groups.

Other objects will appear from the more detailed description of this invention which follows.

The improved process of this invention involves the anionic polymerization of a monomer selected from the class consisting of:

(1) Conjugated, acyclic diolefin which has 4–12 carbon atoms per molecule and which is unsubstituted, substituted with lower alkyl, or substituted with lower alkoxy.

(2) Methacrylic acid ester wherein the ester group is lower alkyl, lower alkyl substituted with lower alkoxy, phenyl, phenyl substituted with lower alkyl, or phenyl substituted with lower alkoxy, and (3) o-chlorostyrene with a catalyst selected from the class consisting of alkali metal alkyl, alkali metal aryl, and alkali metal complex in the presence of an inert solvent at a polymerization temperature of −80° to 0° C., permitting said monomer to polymerize into a polymer having reactive, negatively charged end groups, and thereafter adding an external terminating agent while at least 80% of the end groups of said polymer are still reactive negatively charged end groups, and recovering a polymer having at least 80% of the end groups of said polymer derived from said external terminating agent. An added benefit of this process is that it permits the preparation of a polymer with a narrow molecular weight distribution. In the preferred embodiment of this invention a monomer such as butadiene, methyl methacrylate, or o-chlorostyrene is dissolved in tetrahydrofuran and polymerized at −50° C. to 0° C. with a catalyst prepared by complexing sodium with α-methylstyrene. The polymerization reaction is terminated after a few minutes, normally not more than about 10 minutes, by adding to the polymerization system an external terminating agent which reacts with the growing polymer to form functional groups on the ends of the polymer chain.

The success of this invention in producing the desired product is found by selecting the right reactants and catalysts and subjecting them to the proper polymerization conditions wherein the rate of polymerization is sufficiently faster than the rate of internal chain termination that the "living" polymer can grow to a sufficiently high molecular weight, to be a commercially acceptable material. Impurities in the polymerization system or by-products formed during the polymerization may be sufficiently reactive to react with the ends of the "living" polymer chain and terminate its growth. This type of termination is referred to herein by the expression "internal chain termination." So long as a growing polymer chain is not terminated, it is a "living polymer," and the longer the polymer can remain as a "living polymer," the greater will be its molecular weight. When polymer chains are terminated, they are terminated at various times and, therefore, at various molecular weights, and accordingly as more and more of the chain is terminated internally, the molecular weight distribution becomes broader and broader. It is well-known that polymer manufacturers generally prefer to produce polymers having narrow molecular weight distributions because the product is usually more uniform and has an optimum combination of strength properties and flow properties.

Unless one employs extraordinary measures in the purification of reactants, solvents, and the like, there will be a certain amount of impurities present in a given anionic polymerization system which will cause internal chain termination. Nevertheless, it is important, if one wishes to reduce the amount of internal chain termination, to remove as many impurities as is practical. The rate of internal chain termination also appears to be a function of temperature, in that higher rates of internal termination occur as higher temperatures are employed. For the monomers with which this invention is concerned, it is necessary to employ temperatures as low as about −50° C., or less, in order for the rate of internal chain termination to be low enough to be negligible. Since it is expensive and impractical to operate large commercial processes at such low temperatures, it is important to find means for depressing the rate of internal chain termination at more practical temperatures.

It has been found in this invention that if the "living" polymers are externally terminated within a very short time, generally less than about 10 minutes, after the beginning of polymerization at a temperature −80° to about 0° C., a high molecular weight polymer can be obtained having only a small percentage of its end groups produced by internal chain termination. While the polymerization rate of such a monomer may be slowed down by lowering the polymerization temperature, the polymerization rate is not decreased as much as is the rate of internal chain termination. A particularly good balance has been found for these two rates of reaction at temperatures in the range of −50° to 0° C.

The monomers employed in the process of this invention encompass certain diolefins, certain methacrylate esters, and o-chlorostyrene. The diolefins are conjugated, acyclic diolefins which may be substituted with lower alkyl or lower alkoxy groups and which have 4–12 carbon atoms in the molecule. By the term "lower" is meant 1–4 carbon atoms. Typical of these diolefins are: 1,3-butadiene; 1,3-pentadiene; 1,3-hexadiene; 2,4-hexadiene; 1,3-octadiene; 2,4-octadiene; 1,3-decadiene; 2,4-decadiene; 1,3-dodecadiene; 1-methyl-1,3-butadiene; 1-butyl-1,3-pentadiene; 2,3-dimethyl-1,3-butadiene; 2,4-diethyl-1,3-hexadiene; 1-methoxy-1,3-butadiene; 1,5-dimethoxy-1,3-pentadiene; 3,4-diethoxy-2,4-hexadiene; and 1-butoxy-2,4-octadiene.

The methacrylate esters are esters of methacrylic acid in which the ester group is lower alkyl, lower alkyl substituted with lower alkoxy, phenyl, phenyl substituted with lower alkyl, or phenyl substituted with lower alkoxy. The term "lower" is intended to mean 1–4 carbon atoms. Typical of these monomers are: methyl methacrylate; ethyl methacrylate; propyl methacrylate; butyl methacrylate; methoxymethyl methacrylate; methoxyethyl methacrylate; ethoxybutyl methacrylate; phenyl methacrylate; tolyl methacrylate; xylyl methacrylate; 4-t-butylphenyl methacrylate; 4-methoxyphenyl methacrylate; and 2,4-dimethoxyphenyl methacrylate.

The principal advantage of the process of this invention is that it provides a means for preparing polymers with selected end groups. Many desired characteristics are attributable to specific types of end groups. The capability of changing a thermoplastic polymer into a thermosetting polymer can be accomplished by preparing a polymer with functional end groups which can later be reacted to produce cross-linking bridges between adjacent polymer chains. If polymer chains were prepared with carboxylic acid end groups, these polymers could later be reacted with a glycol to produce bridging esters between polymer chains. It is also known that the solubility of a polymer can be altered by changing the end groups on the polymer chains.

In order to produce a homogeneous material, it has been determined that the "living" polymer before external chain termination should have at least about 80% of its end groups unterminated, that is, having end groups that are the negatively charged groups derived from the growing polymer chain. In this condition, the end groups will react with a suitable external termination agent and produce a polymer with at least 80% of its end groups being of the desired chemical type.

External chain terminating agents which can be added to the anionic polymerization system of this invention are known. The above-mentioned Szwarc patent lists several. Among those which are highly useful are:

(1) Carbon dioxide, which produces the carboxyl group (—COOH);

(2) Carbon bisulfide, which produces the carbodithiol group (—CSSH); and (3) Ethylene oxide which produces the hydroxy-ethyl group (—CH$_2$—CH$_2$OH).

Other reagents to produce other end groups will be apparent to those skilled in polymer chemistry, and since the selection of any particular reagent is not a part of this invention, it is not intended that this invention be limited to any particular external terminating reagent. The preferred external terminating agents include: carbon dioxide, lower alkylene oxides, e.g. ethylene oxide, propylene oxide, and butylene oxide, sulfur, lower alkylene sulfides, e.g. ethylene sulfide, propylene sulfide, and butylene sulfide, carbon disulfide, epichlorohydrin, chlorine, bromine, lower alkyl aldehydes, e.g. formaldehyde, acetaldehyde, propionaldehyde, and butyraldehyde, lower alkyl ketones e.g. acetone, methyl ethyl ketone, diethyl ketone, and dibutyl ketone. Lower alkyl and lower alkylene are intended to mean alkyl and alkylene groups of 1–4 carbon atoms.

A more detailed understanding of this invention may be had by reference to the following examples in which parts and percentages are by weight unless otherwise specified. In these examples, all work was performed under a blanket of nitrogen and all reagents were maintained pure and especially free of moisture and oxygen. Tetrahydrofuran was purified by adding it to a complex of sodium and naphthalene in tetrahydrofuran, and then distilling it from the complex under a nitrogen blanket. α-Methylstyrene was collected directly from a distillation apparatus under nitrogen. Butadiene vapor from a commercial cylinder of butadiene was passed through a series of drying agents before use. Other liquid monomers were distilled under vacuum directly into a receiving burette.

The initiation in several of the examples is a complex of sodium and α-methylstyrene dissolved in tetrahydrofuran. This complex is prepared in a three-neck, fluted flask, equipped with a condenser, nitrogen bubbler, and a stirrer. The third neck of the flask is used for adding reagents. A typical example of the complex preparation is to add to the flask 390 ml. of α-methyl styrene, 1110 ml. of tetrahydrofuran, and 0.7 gram of anthracene. To this mixture, potassium metal is added until the solution turns to a very light red color, usually after the addition of about 0.1 to 0.2 gram of potassium. Then 75.3 grams of sodium dispersion, containing 51.3% of metallic sodium is added, drop-wise over a period of 8 minutes. In order to keep the temperature at a low level, the flask is cooled by a stream of cold air. The cooling is continued after the addition of sodium until the solution reaches room temperature. The strength of the complex is determined by a titration procedure in which 10.0 ml. of the complex is taken into a hypodermic syringe and then added to 15 ml. of n-butyl bromide in an Erlenmeyer flask. The butyl bromide reacts with the complex and liberates sodium bromide. The bromide ion which is produced is titrated by the Mohr titration procedure. The normality of the complex is that volume of solution which will supply 1 equivalent of sodium. The above complex was formulated to be 1.00 normal, and after titration was determined to be 1.04 normal. When the complex was ready for use, it was forced into a purge burette by nitrogen pressure. The burette containing the complex and the burette containing the monomer feed solution were connected to Zenith pumps run by variable speed air motors. The solutions were pumped through two heat exchanger coils in a bath surrounding the polymerization apparatus. The polymerization apparatus was a vessel with a high speed agitator, two inlet ports for the complex and monomer, and an outlet port for the product polymer. The agitator turned at approximately 2000 r.p.m. and performed a highly efficient mixing operation while the monomer was polymerizing. Samples of the polymerized product, the "living" polymer, were collected and held for various lengths of time and then terminated with the desired external terminating agent.

Example 1

An α-methylstyrene/sodium complex in tetrahydrofuran was made as described above using a sodium dispersion which contained 50.6% metallic sodium. Titration of this complex with n-butyl bromide indicated that it was 0.926 normal. The complex was transferred to a burette and held under nitrogen at room temperature until ready for use. The monomer feed solution was prepared by bubbling 250 ml. butadiene into 750 ml. of pure tetrahydrofuran. This was then jacketed with Dry Ice until used. The final volume was 850 ml.

During polymerization, the mixer bath temperature was maintained at 0° C., the feed rate was set at 51.2 cc./min., and the complex rate at 100 c./min. After allowing several cc. of the "living" polymer to pass through the polymerizer to purge it, samples were collected. This was done by allowing "living" polymer under nitrogen to pass into small collection burettes which were maintained at 0° in an acetone bath. A stop watch was started when the material entered the first burette and the sample was collected for 1.00 minutes. After this the "living" polymer solution was switched to the second burette and another stop watch was started, etc. When a given sample had reached a desired lifetime, it was terminated by forcing a portion of it under nitrogen pressure into a tared Erlenmeyer flask containing 25 ml. of tetrahydrofuran and 25 ml. of bromobutane. The flask was then weighed again to determine the amount of polymer solution in it. The bromide ion formed was titrated using the Mohr procedure, and the milliequivalents of live polymer per 10 grams of polymer solution were determined. This procedure was carried out for each sample in succession and the results are shown in FIGURE 1. The polymerizer bath was then cooled to −10° C. and the same procedure carried out again except that the "living" polymer samples were collected for only 0.45 minute. The samples were terminated and titrated as before and the results are also shown in FIGURE 1.

Another run was made exactly as described above. In this case the α-methylstyrene/sodium complex was made using a dispersion which contained 51.3% metallic sodium. The normality of this complex was 1.04. The monomer feed solution was made exactly in the same way as described above. During polymerization the polymerizer bath was maintained at −20° C., the complex was fed at the rate of 100 c./min. and the monomer at the rate of 63.3 cc./min. The "living" polymer samples were terminated and titrated as described above. The polymerizer bath was then cooled to −50° C. and the experiment rerun. The results of both runs are shown in FIGURE 1. The curves in FIGURE 1 clearly show that at 0° C. and −10° C., the "living" polymer solution must be terminated in less than 10 minutes in order to preserve more than 80% of the polymer chain ends without internal termition. At −20° C. and −50° C., polymerization times of 10–60 minutes can be tolerated and preserve more than 80% of the chain ends without internal termination.

Example 2

An α-methylstyrene/sodium complex was made using a sodium dispersion which contained 49.8% metallic sodium. The complex titrated 1.008 normal. A monomer feed solution was made as described in Example 1 and cooled in a jacket of Dry Ice. The complex was stored at room temperature in this run. During polymerization the polymerizer bath was maintained at 0° C. The complex was fed at the rate of 100 cc./min. and the monomer at a rate of 52.5 cc./min. "Living" polymer samples were collected in small sample burettes as described in Example 1 and held at 0° C. for the desired length of time. In this run the samples were terminated with carbon dioxide. A saturated solution of carbon dioxide in tetrahydrofuran was prepared at −78° C. About 50 ml. of this solution were forced into an Erlenmeyer flask (also also −78° C.). A few ml. of the "living" polymer solution were forced into this Erlenmeyer flask with vigorous stirring to cause termination. Each sample was then evaporated and dispersed in benzene. Gaseous HCl was bubbled into the benzene until the pH was about 5 or less. The benzene solution was then filtered and evaporated to obtain the carboxylated polymer, which was titrated with standard base to determine the milliequivalents of carboxyl per gram of polymer. The results are shown in FIGURE 2.

An α-methylstyrene/sodium complex was made using a dispersion containing 51.2% metallic sodium. This complex titrated 1.07 normal. The monomer feed solution was made in the same manner as described above. The polymerizer bath was held at −20° C. The complex was set at the rate of 100 cc./min., samples were collected in the small burettes which were maintained in a bath at −20° C. and were terminated at various times with carbon dioxide as described above. These samples were also recovered, acidified, and the results are shown in FIGURE 2. The results clearly show that in order to have 80% or more of the desired carboxyl groups, one must terminate the sample within about 5 minutes.

Example 3

An α-methylstyrene/sodium complex in tetrahydrofuran was made in the usual manner, and was titrated to be 0.477 normal. The monomer feed solution was made by distilling, under vacuum, 250 ml. of o-chlorostyrene into a burette; then 755 ml. of pure THF were added to the burette. Both the monomer feed and the complex were held at room temperature until used. The polymerizer bath was maintained at 0° C. During polymerization, the complex was fed into the mixer at the rate of 125 cc./min., and the monomer feed at the rate of 57.6 cc./min. Individual samples of "living" polymer were collected in the small burettes (as in the previous examples) in a bath maintained at 0° C., and each sample was terminated at the desired time. In this case, the termination was carried out by passing the live polymer into a tared Erlenmeyer flask containing 50 ml. of THF and 1 ml. of water. The flask was then reweighed to determine the weight of polymer solution added. The amount of chloride ion which had been generated was determined by a standard Mohr titration. Then the polymerizer bath was cooled to −20° C. and the experiment rerun exactly as before. The results of both runs are plotted in FIGURE 3. At 0° C., within 5 minutes nearly 30% of the chain ends had been terminated by internal termination. Even with a total lifetime of about two tenths of a minute, nearly 10% of the chain ends had been terminated. At this temperature, it would be virtually impossible to make a narrow molecular weight distribution polymer; however, at −20° C. and with a lifetime of about two tenths of a minute only 2% of the chain ends had been terminated internally. Under these conditions, it would be possible to make a polymer of fairly narrow molecular weight distribution.

Example 4

Figure 4:
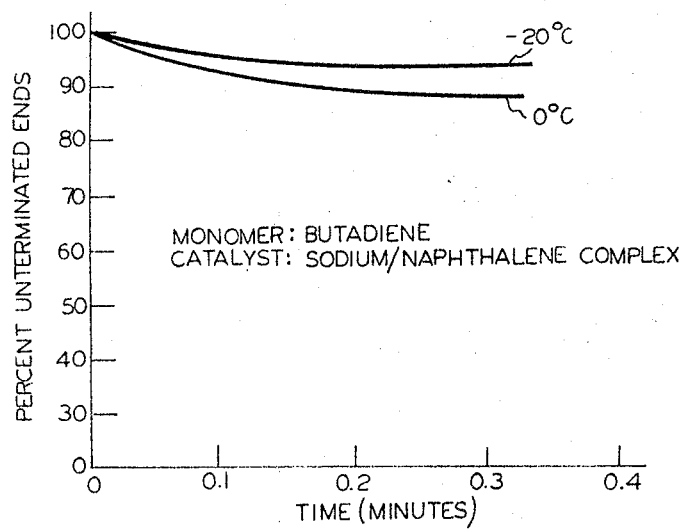

In this experiment a sodium/naphthalene complex in tetrahydrofuran was used as the polymerization initiator. This complex was prepared by adding 128.2 grams of naphthalene to 2000 ml. of tetrahydrofuran. After this, 49.3 grams of a sodium dispersion which contained 47.5% metallic sodium was added slowly to the solution. The resulting solution was stirred for about 3 hours, after which time its normality was 0.46. The monomer feed solution was prepared by bubbling 500 ml. of butadiene into 1000 ml. of tetrahydrofuarn in a burette. The monomer feed solution was then cooled with Dry Ice until ready for use. The complex solution remained at room temperature. During polymerization, the polymerizer bath was held at −20° C. as were the sample collecting burettes. The monomer feed was introduced at a rate of 69.1 cc./min., and the complex at a rate of 100 cc./min. The "living" polymer solution was pumped directly from the polymerizer into the termination flask containing tetrahydrofuran and n-butyl bromide as in Example 1, and the lifetime of the polymer samples was varied by altering the pumping rates. The relative proportion of complex volume to monomer volume was kept substantially constant. The experiment was rerun at 0° C. The results are plotted in FIGURE 4 and show that at 0° C., within three tenths of a minute a rather severe internal termination had taken place.

Example 5

A complex was prepared by adding 800 ml. dried, distilled toluene to a burette, degassing the burette with a light vacuum, and then adding 200 ml. n-butyllithium (commercial solution about 1 molar in hexane). The solution was mixed by bubbling nitrogen through it. To make the monomer feed, 665 ml. toluene and 35 ml. tetrahydrofuran were placed in a burette and 250 ml. butadiene bubbled in at 0° C. The monomer feed was then cooled with a jacket of Dry Ice. During polymerization, the monomer feed was introduced to the polymerizer at a rate of 64.3 cc./min. and the complex at a rate of 75 cc./min. The bath around the polymerizer was held at 15° C.

Samples of the "living" polymer were collected as described in the previous examples and after the desired intervals of time were terminated with n-butyl bromide as described above. About 100 ml. of water and 5 ml. of 2.5 N nitric acid were added and the solutions were put into separatory funnels and the water layer removed (some hexane was added to aid separation). The organic layer was washed once with 25 ml. of water containing 2 ml. of 2.5 N nitric acid. The water layers were combined and titrated for bromide ion by the standard Volhard procedure.

Figure 5:
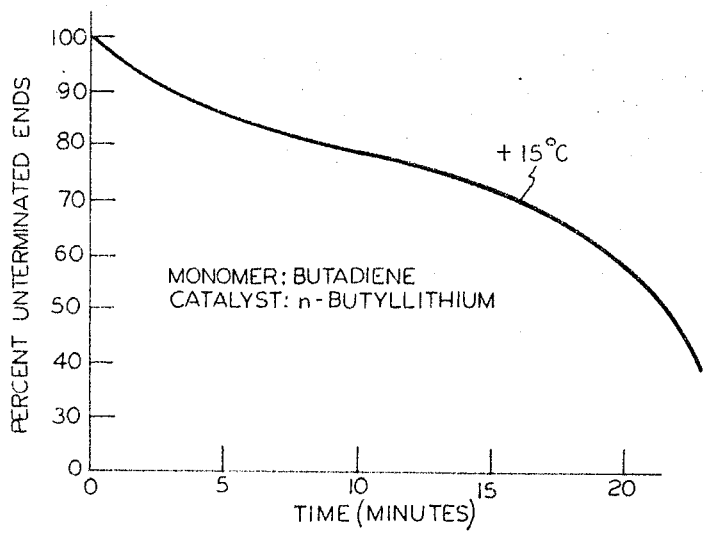

The results are shown in FIGURE 5 indicating that the internal termination is much slower than in the other examples although it is still too rapid for most batch-type operations.

Example 6

Figure 6:
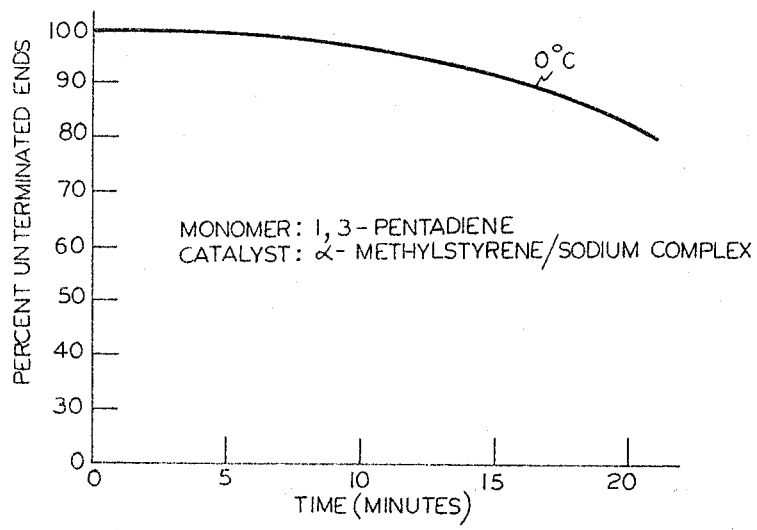

An α-methylstyrene/sodium complex in tetrahydrofuran was prepared as described above from a sodium dispersion containing 51.0% by weight sodium. The complex had a normality of 0.980. The monomer feed solution was made by distilling 250 ml. of piperylene (1,3-pentadiene) into a burette and diluting with distilled tetrahydrofuran to a volume of 950 ml. The monomer feed and the complex were maintained at room temperature until used by being fed concurrently into the polymerization mixer in a bath maintained at 0° C. The feed rate of the monomer to the mixer was 75.5 cc./min. and the feed rate of the complex was 100 cc./min. As described in Example 1, individual samples of "living" polymer were collected, maintained at 0° C., terminated at the desired times with and titrated to determine the proportion of "live" chain ends remaining. The results are shown in FIGURE 6 indicating that the polymerization at 0° C. must continue for longer than about 20–22 minutes for at least 80% of the chain ends to be "live."

Example 7

An α-methylstyrene/sodium complex in tetrahydrofuran was prepared as described above with a normality of 1.012. A monomer feed solution was prepared by distilling 252 ml. of 1-methoxy-1,3-butadiene at atmospheric pressure into a burette and then diluting to 957 ml. with distilled tetrahydrofuran. The polymerization was accomplished as described in Example 1 employing a monomer feed rate of 78.1 cc./min. and a complex feed rate of 100 cc./min. When the polymerization bath was maintained at 0° C. the amount of "live" chain ends remaining at the smallest measurable polymerization time (approximately 0.2 min.) was less than 15%. When the polymerization bath was maintained at −50° C. the "live" chain ends remaining after approximately 0.2 min. of polymerization was about 60–65%. These results indicate that in order to produce "living" polymer with at least 80% of its chain ends "live" a polymerization temperature of less than −50° C. or less should be employed.

Example 8

An α-methylstyrene/sodium complex in tetrahydrofuran was prepared as described above with a normality of 1.059. A monomer feed solution was prepared by distilling 250 ml. of 2,3-dimethylbutadiene at atmospheric pressure into a burette and diluting it to 950 ml. with distilled tetrahydrofuran. The polymerization was accomplished as described in Example 1 employing a monomer feed rate of 68.3 cc./min. and a complex feed rate of 75 cc./min. The polymerization bath was maintained at 0° C. The amount of "live" chain ends was at least 80% of the original chain ends through polymerization times as high as 24 minutes.

Example 9

An α-methylstyrene/sodium complex in tetrahydrofuran was prepared as described above and diluted to 1000 ml. with distilled tetrahydrofuran. The diluted complex had a normality of 0.527. The monomer feed solution was made by distilling under vacuum, 200 ml. of butylmethacrylate and diluting it to 675 ml. with distilled tetrahydrofuran. The polymerization was accomplished as described in Example 1 employing a monomer feed rate of 42.6 cc./min. and a complex feed rate of 75 cc./min. The polymerization bath was maintained at 0° C. The solution drawn from the polymerizer into the sample burettes had the expected deep red color. At the end of 5 minutes, however, the samples were decolorized to lemon yellow, indicating substantially complete internal termination.

When the polymerization was repeated using a bath temperature of −20° C., the collected samples were still red, although noticeably lighter red, after 5 minutes. After 10 minutes all the red color had disappeared. Thus, in order to maintain "live" chain ends on this polymer for a practical time, it is necessary to polymerize at temperatures not above about −20° C.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. The process which comprises initiating the polymerization of a monomer selected from the class consisting of:
   (1) conjugated, acyclic diolefin which has 4–12 carbon atoms per molecule and which is unsubstituted, substituted with lower alkyl, or substituted with lower alkoxy, and
   (2) methacrylic acid ester wherein the ester group is lower alkyl, lower alkyl substituted with lower alkoxy, phenyl, phenyl substituted with lower alkyl, or phenyl substituted with lower alkoxy
with a catalyst selected from the class consisting of an alkali metal alkyl, an alkali metal aryl, and an alkali metal complex in the presence of an inert solvent at a polymerization temperature of −80° to 0° C., permitting said monomer to polymerize into a polymer having reactive, negatively charged end groups, and thereafter adding an external terminating agent while at least 80% of the end groups of said polymer are still reactive negatively charged end groups, and recovering a polymer having at least 80% of the end groups of said polymer derived from said external terminating agent.

2. The process of claim 1, in which said alkali metal is sodium.

3. The process of claim 1, in which said catalyst is a complex of sodium and α-methylstyrene.

4. The process of claim 1, in which said catalyst is butyllithium.

5. The process of claim 1, in which the polymerization reaction time is less than about 10 minutes.

6. The process of claim 1, which comprises initiating the polymerization of butadiene with a catalyst, which is a complex of α-methylstyrene and sodium in an ether at a temperature of −10° to −20° C. and permitting polymerization to occur for a period not exceeding 5 minutes, and thereafter adding a selected external terminating agent to terminate the polymerization reaction, and recovering a polybutadiene having at least 80% of the end groups of the polybutadiene chains derived from said external terminating agent.

7. The process of claim 1, in which said external terminating agent is selected from the group consisting of carbon dioxide, lower alkyl oxide, sulfur, lower alkylene sulfide, carbon disulfide, epichlorohydrin, chlorine, bromine, lower alkyl aldehyde, and lower alkyl ketone.

References Cited

UNITED STATES PATENTS

| | | | |
|---|---|---|---|
| 3,041,312 | 6/1962 | Boyd | 260—47 |
| 3,050,511 | 8/1962 | Szwarc. | |
| 3,135,716 | 6/1964 | Uranek et al. | 260—45.5 |
| 3,139,416 | 6/1964 | Lumb et al. | 260—66 |
| 3,346,666 | 10/1967 | Dennis | 260—879 |

FOREIGN PATENTS

| | | |
|---|---|---|
| 871,611 | 6/1961 | Great Britain. |

OTHER REFERENCES

Shima et al.—"Hammett's Relations In Anionic Copolymerization"—Journal of Amer. Chem. Soc., vol. 85, pp. 1306–1310, November 1962. Copy in Scientific Lib.

The Mechanism of the Anionic Polymerization of Methyl Methacrylate, vol. XLIX, pp. 297–313 (1961), Journal of Polymer Science.

JOSEPH L. SCHOFER, Primary Examiner

WILLIAM F. HAMROCK, Assistant Examiner

U.S. Cl. X.R.

260—89 5, 91.1, 91.5, 94.7